United States Patent [19]

Lang

[11] 4,216,086

[45] * Aug. 5, 1980

[54] PROCESS FOR CLARIFYING WATER

[76] Inventor: John L. Lang, P.O. Box 1242, Midland, Mich. 48640

[ * ] Notice: The portion of the term of this patent subsequent to Sep. 30, 1992, has been disclaimed.

[21] Appl. No.: 801,323

[22] Filed: May 27, 1977

Related U.S. Application Data

[63] Continuation-in-part of Ser. No. 716,658, Aug. 23, 1976, abandoned, which is a continuation-in-part of Ser. No. 539,031, Jan. 6, 1975, abandoned, which is a continuation-in-part of Ser. No. 228,336, Feb. 22, 1976, Pat. No. 3,909,406, which is a continuation-in-part of Ser. No. 144,416, May 17, 1971, abandoned.

[51] Int. Cl.$^2$ ................................................ C02B 1/20
[52] U.S. Cl. ........................................ 210/47; 210/52
[58] Field of Search ................... 210/42 R, 43, 45, 47, 210/51–53, 56; 423/115, 118, 121

[56] References Cited

U.S. PATENT DOCUMENTS

| | | | |
|---|---|---|---|
| 1,604,125 | 10/1926 | Kern | 210/47 |
| 1,620,332 | 3/1927 | Evans | 423/121 |
| 1,872,262 | 8/1932 | Evans | 210/51 |
| 1,916,697 | 7/1933 | Stohr | 423/121 |
| 2,310,009 | 2/1943 | Baker et al. | 210/51 |
| 2,452,041 | 10/1948 | Elmore | 423/115 |
| 3,101,317 | 8/1963 | Starry | 210/52 |
| 3,285,849 | 11/1966 | Watanabe et al. | 210/52 |
| 3,627,679 | 12/1971 | Fuller | 210/45 |
| 3,827,984 | 8/1974 | Kawert | 210/52 |
| 3,909,406 | 9/1975 | Lang | 210/47 |

FOREIGN PATENT DOCUMENTS 227429  1/1926  United Kingdom ...................... 210/52

*Primary Examiner*—Thomas G. Wyse

[57] ABSTRACT

The use of fusion-formed compounds of polyvalent cations with aluminate, alumino-borate and -ferrite anions has been found to provide improved clarification methods for settling aqueous suspensions of solids. The use of these materials has been found to be more effective than the use of the corresponding conventional mono-valent cation compounds. A particularly effective form of these clarifying agents is obtained when the preparation thereof is carried out by high temperature methods, which brings about the incipient or actual fusion of the materials. Recycling of the once-used clarifying agents is possible when using these materials, especially when the flocculated solids are incinerated during the ultimate disposal step.

6 Claims, No Drawings

PROCESS FOR CLARIFYING WATER

CROSS-REFERENCES TO RELATED APPLICATIONS

This application is a continuation-in-part of Ser. No. 716,658 filed Aug. 23, 1976, herewith abandoned, which was in turn a continuation-in-part of Ser. No. 539,031 filed Jan. 6, 1975, abandoned, which was a continuation-in-part of Ser. No. 228,336 filed Feb. 22, 1976 which issued in part as U.S. Pat. No. 3,909,406 dated Sept. 30, 1975, which was in turn a continuation-in-part of Ser. No. 144,416 filed May 17, 1971, abandoned in favor of its successor.

BACKGROUND OF THE INVENTION

The problems involved in the purification of water, particularly that water containing suspended solids, has been the subject of much investigation for an extended time period. This is especially true in the cases of municipal water supply, industrial water supply, the treatment of municipal sewage, the treatment of discharges from mineral dressing operations, food processing plants, breweries, and many other operations directed toward man's existence and endeavor. Many materials have been used to aid in the purification of water and wastes involved in such operations. Some of these materials are relatively old; the use of alum, ferric chloride, other ferric- or ferrous-salts, alone or in conjunction with lime, sodium aluminate, soluble starches, water soluble natural, modified, and synthetic polymers, and the like are examples of such flocculating agents. Recently, much attention has been given to the use of natural gums and synthetic high molecular weight polyelectrolytes, as typified by poly(acrylic acid) and salts thereof, poly(vinylbenzene sulfonic acid and salts thereof, the water-dispersable reaction products of nucleophilic reagents with polymers containing monomeric units of vinyl benzyl -chloride and -bromide, poly(ethyleneimine), poly(maleic acid) and water-dispersible salts thereof, and many others. Relatively non-ionic polymers, as poly(acrylamide)-and guar gum-types have also found wide application for use in water clarification. Most of these materials must be used in certain pH ranges, and in proportion to the solids content of the water, etc.; the maintainance of which parameters may be difficult during a continuous-bassis tainance of which parameters may be difficult during continuous-basis operation.

SUMMARY OF THE INVENTION

The object of this invention is to provide a new water purification system.

Another object of this invention is to provide an inexpensive, easy method for removal of suspended solids from water, either by separation of clarified supernatant, or by providing a more easily filtrable mixture.

A further object of this invention is to provide a process which uses a new flocculating system which settles suspended solids from water at a rapid rate, and produces a satisfactoriy clear supernatant portion which may be reasily removed as purified water, thus greatly increasing the overall capacity of existing water purification installations.

Another object of this invention is to provide flocculating and settling agents which are physiologically inert, and are themselves non-contaminants, in terms of the effect of them upon plants and animals.

Other objects will become apparent to those skilled in the art upon reading the specification and claims of this instrument.

In accordance with the invention, the water containing undesirable suspended solids is treated with an oxygen compound with aluminum, of oxygen with aluminum and boron, of oxygen with iron, and the like which also contains a section of at least one element selected from Group II of the Periodic Table of Elements. These compounds are essentially those of polyvalent cations with anions such as aluminate, -borate-, poly-aluminate, -ferrite, and the like.

Group II of the Periodic Table of Elements includes magnesium, calcium, strontium, barium, zinc, cadmium, etc. Iron may also be a cation, as well as other elements of Group VIII-Series 4 of the Periodic Table.

The preferred embodiment of the invention comprises the use of finely ground fusion-formed compounds of calcium, magnesium, and barium with aluminate and poly-aluminate anions.

Many of these materials are prepared by calcining, i.e., heating at temperatures at which water and other volatiles are at least partially expelled, and then to a further degree that at least incipient fusion takes place, of such raw materials as limestones, dolostones, marls, clays, shales, metallurgical slags, and other materials containing aluminum, calcium, magnesium, zinc, barium, iron, and chemically analogous elements in admixture when required to produce a settling agent having an effective content of the compounds herein disclosed.

As especially advantageous clarification agent of this type may be prepared by "clinkering", i.e., fusion, of a mixture of limestone and bauxite, so as to prepare a material containing 28% or more of calcium aluminate, followed by pulverization of the cooled clinker.

The use of these new clarifying agents is easily carried out, usually by simply mixing the untreated water with either the dry pulverized clarifying agent or a slurry of the clarifying agent in water, then allowing flocculation to take place in a quiescent or gently agitated settling zone, followed by removal of the clarified water by decantation, siphoning, pummping off, filtration, or any of the other known methods or combination thereof.

The action of the water-clarifying agents of this invention can be augmented in their action by use of adjuncts selected from the group consisting of water-resolvable compounds of Groups II and VIII-Series 4 of the Periodic Table of Elements, conventional flocculating agens, ground mineral density-regulating materials, and finely-divided inorganic materials having at least some ion-exchange characteristics, when so desired. These adjuncts can be used singly or in combination if operational conditions so indicate.

It should be understood that the once-used clarifying agents can be recycled by mixing with another portion of untreated water. This recycle procedure can be repeated several times, the number of cycles being dependent upon the degree of contamination of the untreated water and upon whether or not additional make-up increments of clarifying agent are added at the recycle stage. This recycle procedure produces extra volumes of clarified water, when any separation procedure is used between cycles. The use of recycle procedure increases the solids content of the flocculated residue several fold, thus increasing the capacity of water treating plants using such procedure when compared to conventional operation, and also minimizing the volume of settled solids that must be further treated, e.g., dewatered, wet-incinerated, dried or transported for ultimate disposal. In the case of municipal waste treatment plants, this method of operation converts, for practical purposes, a secondary treatment plant into a tertiary-stage treatment plant, with little or no added capital costs, and also reduces the volume of sludge which requires de-watering, wet- or dry- incineration, or transportation for its ultimate disposal.

Because of the inorganic nature of the material herein taught to be effective clarifying agents, they can be re-cycled in another way; when incineration is used as the means for ultimate disposal, these inorganic clarifying agents remain a part of the combustion residue which contains both the cationic and anionic portions of the clarifying agent, and can thus be recycled either per se or after comminution to the degree desired.

The settled mixture of suspended solid contaminant and clarifying agent can be readily filtered, or can be de-watered by other methods in order to separate the clarified water from the residual solids. The settled solids may be wet-incinerated, dry-incinerated, dried, etc., used for land-fill, fertilizer, soil-builders, or otherwise used. They can be more easily transported for ultimate disposal in their hereby-concentrated form, or when desired, recycled into the same or other treatment processes, or otherwise disposed.

In the case of municipal waste water treatment, the settled solids and/or de-watered solids may be converted into an acceptable form of soil nutrient.

The materials herein elucidated as clarifying agents for water are biologically inocuous they do not create ecological or toxological problems in the water treated therewith. The chemical oxygen demand ("C.O.D.") and biological oxygen demand ("B.O.D."), and hence the total oxygen demand ("T.O.D.") of these new flocculating agents are nil; this is because they are already oxidized during their preparation to an extent greater than that attainable at any temperature range attainable in the liquidous state of water under reasonable pressures.

The following examples are given in order to merely illustrate the invention, and are not to be construed as limiting the invention in anyway.

EXAMPLE I

Tricalcium aluminate was prepared by dissolving 18.12 g (0.02 mole) of ammonium alum in water and making the solution up to a total of 50.0 g. followed by reaction with an excess of ammonium hydroxide. The aluminum hydroxide so produced was filtered and washed until free of excess ammonium hydroxide, and then redispersed in water. To this dispersion was added 3.36 g (0.06 mole) of calcium oxide, and the mixture thoroughly mixed, dried on a hot plate until a paste of the finely divided solids resulted. This was placed in a platinum crucible and the physically bound water driven off by heating. An oxygen - acetylene torch was then used to heat and fuse the contents of the crucible at white heat, producing a homogenous light yellow glassy material. This was removed from the crucible, crushed into fine particles, and stored in a stoppered bottle. This product is that referred to as "tricalcium aluminate, (fused)" in the Examples.

In similar reactions at white heat, dicalcium silicate was formed by fusion together of 3.1 parts of silica sand with 4.4 parts of calcium oxide; tricalcium silicate by fusion together of 4.96 parts of calcium oxide with 2.8 parts of silica sand, zinc aluminate by fusion of the analogous zinc product as above for preparation of tricalcium aluminate, and magnesium aluminate by the same method, following coprecipitation of 1.4 parts sodium aluminate with 2.3 parts of hydrated magnesium sulfate from aqueous solution.

EXAMPLE II

To 50 milliliters of a typical activated sludge obtained from the secondary stage of a municipal waste treatment plant was added 0.14 g of powdered tricalcium aluminate (fused). The solids in the activated sludge flocculated. In similar tests, dicalcium aluminate, zinc aluminate, magnesium aluminate, sodium ferrite, calcium ferrite, and dicalcium silicate were used to treat activated sludge.

EXAMPLE III

A series of experiments were carried out using some of the flocculating agents herein concerned, as tricalcium aluminate, and a powdered cement containing 40% calcium aluminate, in comparison with known flocculating agents, viz.: alum, ferric chloride, ferric choride plus lime, sodium aluminate and ferric chloride - sodium hydroxide, as settling agents for the solids in activated sludge as above described in Example II. One hundred milliliters of the treated sludge containing these agents was allowed to settle for 10 minutes (600 seconds) and the volume of clear supernatant recoverable water observed and recorded. The results are given in Table 1.

TABLE 1

| FLOCCULANT | AMOUNT g/100 ml | CLARIFIED VOLUME ml at 600 sec. |
|---|---|---|
| Tricalcium Aluminate (fused) | 0.5 | 19. |
| "40% Tricalcium Aluminate Cement""HTCAC" | 0.2 | 25. |
| Alum | 0.5 | 1. |
| Ferric Chloride | 0.1 | 1. |
| Ferric Chloride + Lime | 0.2 | 3. |
| Ferric Chloride + NaOH. to pH 8 | 0.54 | 0. |
| Sodium Aluminate | 0.52 | 0. |

In a similar test, tri-calcium aluminate (fused), tricalcium aluminate (as prepared), "40% tri-calcium aluminate cement," prepared from ca. 40% tri-calcium aluminate, ca. 50% tri-calcium silicate, and ca. 10% tricalcium silicate fused together, cooled, and pulverized (HTCAC), and calcium borate, the new flocculants concerned herein, were compared with the known, conventional flocculant Alum when used to clarify an activated sludge such as described in Example II. The result are given in Table 2.

TABLE 2

| CLARIFYING AGENT | AMOUNT g/100 ml | CLARIFIED VOLUME ml at 600 sec. |
|---|---|---|
| Tricalcium Aluminate (fused) | 0.5 | 17. |
| Tricalcium Aluminate (as prepared) | 0.5 | 12. |
| Calcium Borate | 0.5 | 9. |
| "40% Tricalcium Aluminate Cement" ("HTCAC") | 0.5 | 6 |

TABLE 2-continued

| CLARIFYING AGENT | AMOUNT g/100 ml | CLARIFIED VOLUME ml at 600 sec. |
|---|---|---|
| Portland Cement | 0.5 | 3. |
| Alum | 0.5 | 1. |
| Blank | — | 1. |

EXAMPLE IV

A comparison was made of filtration rates of untreated activated sludge as described in Example II with the rate obtained when it was treated with a typical clarifying agent of the invention and when treated with the conventional inorganic flocculating agents. The data are given in Table 3.

TABLE 3

| FLOCCULANT | AMOUNT g/100 ml | FILTRATION RATE (% of volume total/sec) ×100 |
|---|---|---|
| Tricalcium Aluminate | 0.273 | 30.1 |
| Alum | 0.5 | 21.7 |
| Ferric Chloride+Lime | 0.2 | 16.8 |
| Sodium Aluminate | 0.52 | 3.96 |
| BLANK | 13 | 6.88 |

Additional work was done comparing the filtration volume at 400 seconds in percent of original volume of sludge. The tricalcium aluminate clarifying agent of this invention was compared with conventional inorganic flocculating agents of commerce. These data were obtained by methods given in the description of Example IV. The results are tabulated in Table 4.

TABLE 4

| FLOCCULANT | AMOUNT g/100 ml | % VOLUME FILTERED at 400 seconds |
|---|---|---|
| Tricalcium Aluminate | 0.273 | 86. |
| Alum | 0.5 | 86. |
| Ferric Chloride + Lime | 0.5 | 83. |
| Ferric Chloride + NaOH to pH 8 | 0.54 | 38. |
| Sodium Aluminate | 0.2 | 37. |
| BLANK | — | 73. |

EXAMPLE V

A set of experiments was carried out in which a comparison was made to show the effect of the valence of the positive ion of the inorganic clarifying agent upon the clear volume obtained ten minutes after treatment of activated sludge with aluminates and ferrites of mono- and di-valent ions. This shows the marked superiority of the poly-valent ion compounds of this invention over the mono-valent ion compounds of the conventional flocculating agents. These data are given in Table 5.

TABLE 5

| FLOCCULANT | AMOUNT g/100 ml | VALENCE OF + ION | CLARIFIED VOLUME ml at 600 seconds |
|---|---|---|---|
| BLANK | — | — | 1. |
| Sodium Aluminate | 0.5 | 1 | 1. |
| Tricalcium Aluminate | 0.5 | 2 | 17. |
| Sodium Ferric | 0.54 | 1 | 0. |
| Calcium Ferric | 0.5 | 2 | 2. |
| Ferrous Aluminate | 0.5 | 2 | 2. |
| Ferric Aluminate | 0.5 | 3 | 4 |

EXAMPLE VI

In an experiment in which a comparison was made of the efficacy of "fused." with "unfused." clarifying agents of the invention, an activated sludge similar to that described in Example II was treated with both types of material. The data obtained are given in Table 6.

TABLE 6

| FLOCCULANT | TREATMENT | AMOUNT g/100 ml | CLARIFIED VOLUME ml at 600 seconds |
|---|---|---|---|
| BLANK | — | — | 1. |
| Tri-calcium Aluminate | Unfused | 0.5 | 12. |
| Tri-calcium Aluminate | Fused | 0.5 | 17. |
| "40% Tricalcium Aluminate Cement" "HTCAC" | Unfused | 0.34 | 4. |
| "40% Tricalcium Aluminate Cement" "HTCAC" | Fused | 0.34 | 6. |

EXAMPLE VII

A study similar to that described in Example VI was carried out in which several inorganic flocculants were compared. The data given in Table 7 again shows the efficiency of the polyvalent ion compounds of the invention are characteristic of this group of elements.

TABLE 7

| FLOCCULANT | AMOUNT g/100 ml | CLARIFIED VOLUME ml at 600 seconds |
|---|---|---|
| BLANK | — | 1. |
| Magnesium Aluminate | 0.5 | 9. |
| Zinc Aluminate | 0.5 | 8. |
| MIXTURE "Synthetic" Calcium Aluminosilicate (Calcium silicate Calcium Aluminate) | 0.5 | 12. |
| Portland Cement | 0.5 | 5. |

EXAMPLE VIII

A series of experiments were carried out in which the addition of a fine clay was added to the mixture of the clarifying agents of the invention and the activated sludge described in Example II. The data show the efficacy of this refinement, and are tabulated in Table 8.

TABLE 8

| FLOCCULANT | AMOUNT g/100 ml | ADDITIVE | AMOUNT g/test | CLEAR VOLUME ml at 600 sec. |
|---|---|---|---|---|
| BLANK | — | — | — | 1. |
| Tricalcium Aluminate | 0.5 | — | — | 4. |
| " | 0.5 | Clay | 0.5 | 31. |
| Calcium Aluminosilicate | 0.5 | — | — | 12. |
| " | 0.5 | Clay | 0.1 | 40. |
| " | 0.5 | Volcanic Ash | 0.1 | 59. |
| "40% Tri-calcium Aluminate Cement" "HTCAC" | 0.5 | Clay | 0.1 | 27. |
| Alum | 0.5 | — | — | 1. |
| Ferric Chloride + Lime | 0.2 + 0.05 | — | — | 3. |
| Clay | 0.5 | — | — | 0. |
| Volcanic Ash | 0.5 | — | — | 0. |

I claim:

1. The process for purification of water having undesirable suspended solids which comprises the steps of mixing said impure water with a finely-divided water-hydratable material consisting at least in part of a compound whose anionic component is selected from the group consisting of: i. oxygen and aluminum, and ii. oxygen and iron, and whose cationic portion is at least one selected from the group of the ions of elements of Group II and Group VIII-Series 4 of the Periodic Table of Elements, which compounds are those prepared by a process which attains at least the incipient fusion thereof; whereby the undesirable suspended solids in the water become flocculated, followed by separation of the purified water from the flocculated undesirable suspended solids.

2. The process of claim 1, wherein the water-hydratable material comprises calcium aluminate.

3. The process of claim 1, wherein the water-hydratable material comprises the product formed from reaction of a calcium compound with an aluminum ore.

4. The process of claim 1, wherein at least one adjunct selected from the group consisting of water-resolvable compounds of Groups II and VIII-Series 4 of the Periodic Table of Elements, conventional flocculating agents, ground mineral density-regulating materials, and finely-divided inorganic materials having at lease some ion-exchange characteristics is added to augment the flocculation of the undesirable suspended solids initially present in the water to be purified.

5. The process for purification of water which comprises the steps of mixing water containing undesirable suspended solids with a finely-divided water-hydratable material formed by a process wich attains at least the incipient fusion thereof and consisting at least in part of a silicate of an cation of an element selected from Group II of the Periodic Table of Elements, whereby the undesirable suspended solids in the water, are flocculated, followed by the separation of the purified water from the thereby flocculated undesirable suspended solids.

6. The process of claim 5, wherein at least one adjunct selected from the group consisting of water-resolvable compounds of Groups II and VIII-Series 4 of the Periodic Table of Elements, conventional flocculating agents, ground mineral density-regulating materials, and finely-divided inorganic maerials having at least some ion-exchange characteristics is added to augment the flocculation of the undesirable suspended solids initially present in the water to be purified.

* * * * *